Aug. 26, 1969   R. W. MILLER   3,463,254

DRILLING APPARATUS

Filed Jan. 25, 1968

INVENTOR.
ROBERT W. MILLER
BY
ATTORNEYS

United States Patent Office 3,463,254
Patented Aug. 26, 1969

3,463,254
DRILLING APPARATUS
Robert W. Miller, Cincinnati, Ohio, assignor to Alaskaug, Inc., Cincinnati, Ohio, a corporation of Ohio
Filed Jan. 25, 1968, Ser. No. 700,506
Int. Cl. E21c 5/00, 9/00, 11/00
U.S. Cl. 175—102                                    10 Claims

ABSTRACT OF THE DISCLOSURE

The disclosure illustrates apparatus for drilling relatively hard material which includes a vibrator positioned in a rotatable auger mounting shaft for periodically impacting the auger into the material in the direction of the axis. Resilient means is positioned between the vibrator and the mounting shaft to prevent vibration in a drive shaft and intermediate extension shafts to which the mounting shaft is secured. The vibrator is conveniently actuated by air pressure which is supplied from a remote air pressurizing unit through a conduit adjacent the drive shaft, intermediate extension shafts and mounting shaft.

---

The present invention relates to drilling apparatus and more particularly to apparatus for drilling passageways through a relatively hard non-homogeneous material such as earth or rock.

It is a prime object of the present invention to substantially reduce the power required to bore a passageway through such relatively hard material.

It is a further object to increase the speed and efficiency with which a passageway is drilled through such hard material while at the same time minimizing the strain on the drilling apparatus.

In one form of the present invention the above objects are achieved by providing the apparatus described below for use with a rotatable power shaft and an auger. The apparatus comprises a mounting shaft for connection at one end with the power shaft. The mounting shaft has a secondary shaft extending from the opposite end of the mounting shaft, the secondary shaft being rotatable with the mounting shaft and axially displaceable for a limited extent relative thereto. A vibrator is positioned in the mounting shaft and shock-isolated from the power shaft for providing a succession of rapid axial impacts on the secondary shaft thereby impacting the auger into the material. As a result the power required to rotate the shaft for drilling the material is substantially reduced and the speed and efficiency of drilling is increased.

Figure 1:
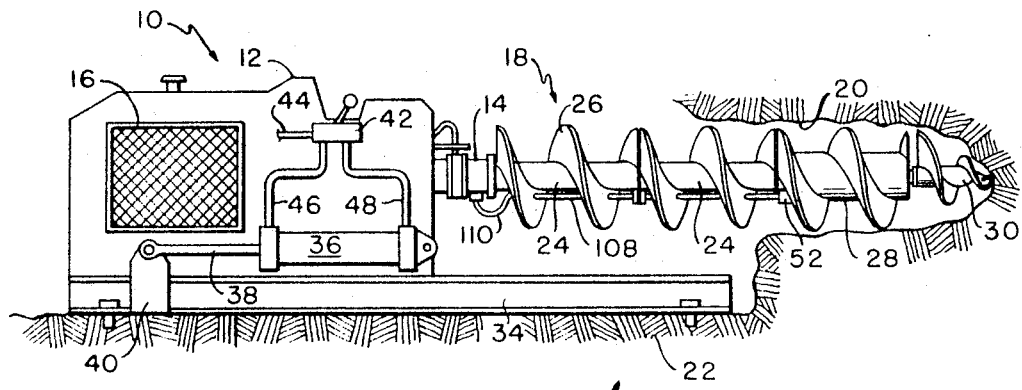
FIG. 1 is a simplified elevational view of a horizontal drilling unit embodying the present invention.

Reference is now had to FIG. 1 which illustrates a drilling unit 10 adapted particularly for drilling horizontal holes through hard material, such as rock formations. The drilling unit comprises an operator-controlled power unit 12 having a rotatable drive shaft 14. The drive shaft 14 is powered by a suitable motor positioned in the rearward section 16 of the power unit and powering the drive shaft through a system of clutches and gears, controlled by an operator. A drill assembly, generally indicated by reference character 18, extends from the drive shaft 14 for drilling a passageway 20 through rock, for example, indicated by reference character 22. The drill assembly comprises a series of intermediate shafts 24, 24 and an auger mounting shaft 28, which have helixes 26 formed thereon to form flights for mechanically carrying away spoil from the passageway 20. The auger mounting shaft 28 provides a mounting for an auger 30 which is provided with appropriate cutting bits. The auger 30 may be any one of a number of well-known augers adapted for use in drilling hard material such, for instance, as that described in Henning Patent 3,024,856.

The power unit 12 includes means adapted to urge the drill assembly into the material 22 for drilling passageway 20. For this purpose the power unit 12 slides on a pair of rails 34 anchored adjacent the place where drilling is to take place or to the floor of a chamber formed in the material 22. Each of a pair of hydraulic actuators 36 (only one of which is shown) is secured at its head end to the power unit 12 and at its piston rod 38 to a mounting plate 40 secured to one of the rails 34. A control valve 42 receives hydraulic fluid from a suitable hydraulic fluid pressure source (not shown) via conduit 44. Through operator manipulation the valve 42 selectively directs the fluid through conduits 46, 48 to opposite ends of the cylinders of the actuators 36 to reciprocate the piston rods 38 and thus reciprocate the power unit 12 relative to the rails 34.

The drilling of the passageway 20 is accomplished by first engaging the gear system so that the power unit rotates the drive shaft 14. The drill assembly 18 and specifically the auger 30 is then urged into the material 22 by extending the cylinder piston rods 38. Suitable pressure gauges may be included in the hydraulic system so that the operator may control the amount of force applied to urge the auger 30 into the material. As is usual, the force used to urge the auger into the material is quite substantial. When the piston rod 38 is at the end of its stroke, the control valve 42 is manipulated to retract the piston rods 38 so that the drive shaft 14 pulls away from the adjacent intermediate shaft 24. The intermediate shafts 24, the mounting shaft 28, and the auger 30 are held in the passageway while an additional intermediate shaft is inserted between the intermediate shaft 24 and the drive shaft 14. The drive shaft 14 is then caused to rotate and the cylinder piston rods 38 extended to again urge the drill unit 18 into the passageway to further extend the passageway 20. It is thus apparent that holes of substantial length may be drilled by using this technique.

In accordance with the invention the auger mounting shaft 28 is provided with a vibrator, shock-isolated from the source of torque, to increase the rate at which and efficiency with which the passageway 20 is drilled, thereby also minimizing the strain on the intermeidate shafts 24.

Figure 2:
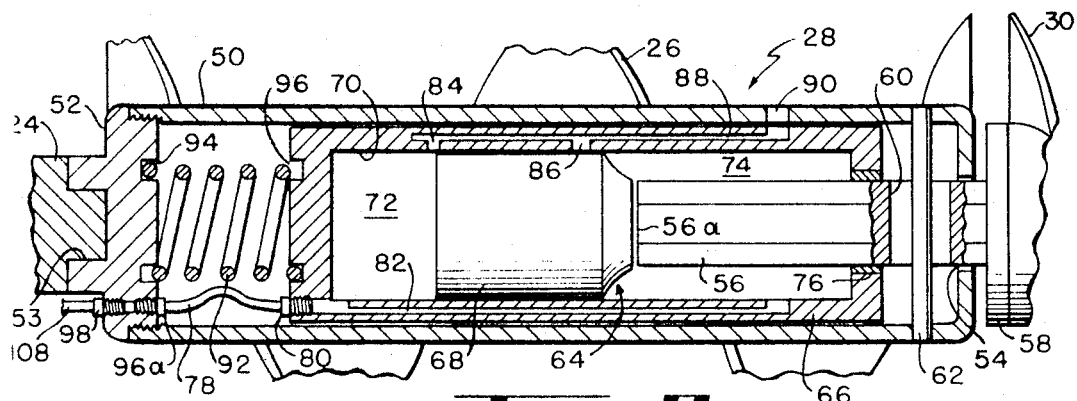
FIG. 2 is a detailed longitudinal section view of a portion of the drilling unit shown in FIG. 1 which particularly illustrates a prime feature of the present invention.

Reference is now had to FIG. 2 which illustrates in detail the auger mounting shaft 28. The mounting shaft 28 comprises an outer casing 50 having a threaded end cap 52 at one end which has a female hexagonal recess 53 for mounting with the drive shaft 14 of the intermediate shafts 24, as later described. The opposite end of the casing 50 has a noncircular opening 54, such as a hexagonal opening, into which is telescoped a hexagonal shaft 56. The exterior end of the shaft 56 has secured thereto a mounting plate 58 which provides a mounting pad for the auger 30. It will be apparent to one skilled in the art that the plate and shaft 56 may be adapted to readily mount well-known types of earth augers. The shaft 56 and plate 58 rotate with the casing 50 but are displaceable axially relative thereto. To limit the displacement of the shaft 56 a generally radial slot 60 is provided therethrough which receives a pin 62, secured to the walls of the casing 50. The inner end of the shaft 56 extends to a vibrator 64.

The vibrator 64 comprises an outer cylinder 66 which has relatively heavy piston 68 displaceable in an internal bore 70. The piston 68 divides the bore 70 into variable volume chambers 72 and 74. The interior end of shaft 56 extends through a sealed opening 76 in one end of the cylinder 66 and into the chamber 74 where the heavy piston 68 may impact its end in the area denoted as 56a in FIG. 2.

It should be pointed out at this time that the specific showing of the vibrator 64 is exemplary and is not intended to be a limitation on the scope of the present invention. As herein illustrated the shaft 56 extends into the vibrator housing 66 for contact with the reciprocable piston 68. This has been done to simplify explanation of the present invention. However, in the usual case, vibrators are provided with an intermediate shaft which provides an impacting surface exterior to the chamber in which the piston is located. In that case the shaft 56 would be mounted to the exterior of the casing 66 in such a manner that an impacting surface could contact it.

A flexible conduit 78 and a fitting 80 in the end of the cylinder 66 provide a flow path for pressurized fluid such as air, from a source later to be described, to the chamber 72 and also to the chamber 74 via passageway 82 formed in the walls of the cylinder 66. A pair of exhaust ports 84 and 86 cooperate with opposite edges of the piston 68 to define discharge valves for the chamber 72, 74 respectively. The ports 84 and 86 connect with a discharge passageway 88 in the cylinder housing 66 and a port 90 through the wall of the casing 50 intermediate the flights 26. A relatively heavy spring 92 is received in a recess 94 in the end cap 52 and a recess 96 in the cylinder 66 to urge the vibrator 64 towards the shaft 56 and to shock-isolate it from the drive shaft 24.

Figure 3:
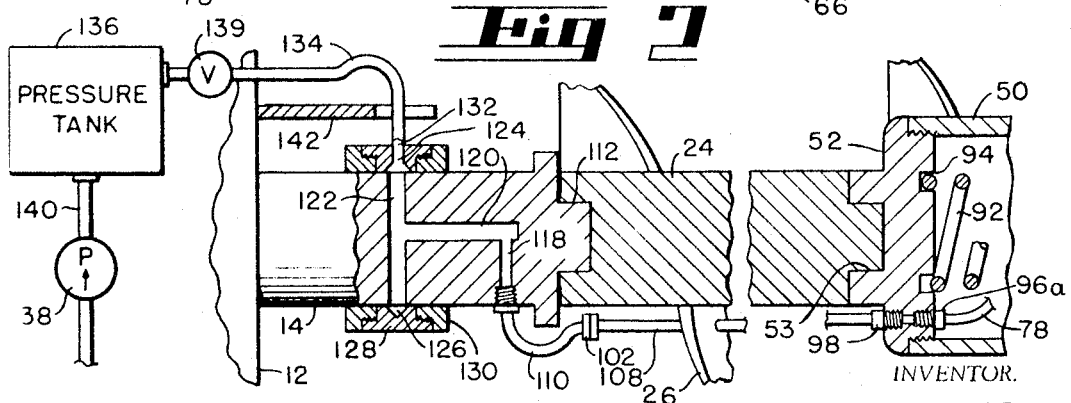
FIG. 3 is a fragmentary longitudinal section view of the apparatus shown in FIG. 1 which partly illustrates another feature of the present invention.

The vibrator 64 is adapted to be actuated by pressurized fluid and specifically by pressurized air from the conduit 78. This pressurized air is supplied via the system illustrated in FIG. 3. As particularly shown therein, the flexible conduit 78 has a second fitting 96a secured to the end cap 52. Fitting 96a connects with a coupling 98 which is used to couple one end of a conduit 108 to the flexible conduit 78. The conduit 108 is longitudinally mounted adjacent the intermediate shaft 24 and passed through the helixes 26 to the opposite end of shaft 24. A coupling 102 is positioned at the opposite end of conduit 108 to couple the conduit 108 to a corresponding conduit on an additional intermediate shaft or to a conduit 110 in the drive shaft 14. A radial passageway 118 and a longitudinal passageway 120 form a flow path from the conduit 108 to a plurality of radial passageways 122 in the drive shaft 14. The radial passageways 122 extend to an annular chamber 124 formed by a V groove 126 formed in a ring 128 positioned around the shaft 14. The chamber 124 is sealed by a pair of suitable ring seal assemblies 130 threaded into opposite ends of the ring 128.

A port 132 connects with a flexible conduit 134 which extends to a pressure tank, schematically shown by reference character 136. The pressure tank 136 is supplied with pressurized fluid, such as air, via conduit 140, from the pump 138 which may be operatively connected to the power unit. An operator-controlled valve 139 is interposed in the conduit 134 between the pressure tank 136 and the chamber 124. The ring 128 and the seal assemblies 130 are restrained from rotating by a fork assembly 142 secured to the power unit 12 and extending on opposite sides of the conduit 134.

As the drive shaft 14 is rotated and the drill unit urged into the material 22 in operation, pressurized fluid is applied to the annular chamber 124 via operator-controlled valve 139. The air then follows a flow path through the conduit 110, conduits 108, and through the flexible conduit 78 to the chambers 72 and 74. Depending upon the initial location of the piston 68, the pressurized air in the chambers 72 and 74 urges the piston 68 in a given direction. As herein illustrated, the piston is shown in a position to the right where it covers port 86 and uncovers port 84. As a result, pressure is reduced in chamber 72 and increased to the supply pressure level in chamber 74. Owing to the pressure differential across the piston 68, it is then displaced to the left. As the piston displaces to the left the port 84 is closed and the port 86 opened. When this happens the pressure in chamber 72 increases to the supply pressure level and the pressure in chamber 74 is reduced. The pressure differential across the piston 68 is reversed and the piston is displaced to the right against the end of the shaft 56. The heavy piston 68 impacts the shaft 56 with a sufficient degree of force to impact the auger 30 into the material 22 and aid in the removal thereof as the flights 26 carry back the spoil. The air-powered vibrator 64 is thus capable of producing a rapid succession of impacts on the shaft 56 to substantially increase the speed and efficiency of the drilling and to reduce the power required to drill the passageway 20. It is apparent that the piston will continue to reciprocate until the pressure supplied to the chambers 72 and 74 is terminated. As the piston 68 impacts the shaft 56 with a high degree of force, the spring 92 acts to isolate or absorb the reaction to the impact and minimize, if not eliminate, the vibrations transmitted to the intermediate string of drills and the drive shaft 14.

By producing an impacting vibrating force immediately adjacent the auger, a much more effective utilization of the energy available in the vibrator 64 is achieved. In addition, a vibrator of much greater energy capacity may be used to achieve a high degree of impacting force without the necessity for increasing the strength of the intermediate shafts 24. By effectively isolating the intermediate shafts 24 and the drive shaft 14 from the reaction to the vibrator 64, the stresses imposed thereon are substantially minimized which enables a greater life and also provides a substantial increase in operator comfort and smoothness. In addition, the absence of vibrations in the shafts 14 and 24 effectively eliminates the possibility of induced oscillations in the intermediate shafts, which could cause the drill unit 18 to deviate from its intended path and cause excessive wear on bearings and associated parts.

It should be noted that the discharge air from the vibrator 64 is adapted to exhaust from the casing 50 adjacent the auger. When drilling the elongated hole, this discharge of air flows to the outer end of the hole and thus aids the mechanical action of the flight in the removal of spoil from the passageway. The use of the flight and the discharge air to remove the spoil enables operation in essentially a dry environment, i.e., without the need for a slurry and its attendant handling problems.

The present invention is not limited to use with the particular drilling unit shown nor is it limited to use with the particular vibrator shown. It will be obvious to those skilled in the art that other vibrating mechanisms such as those having valve systems that are separate from the impacting piston may be used with equal advantage. Accordingly, the scope of the present invention is to be determined solely from the appended claims.

Having thus described the invention, what is claimed as novel and desired to be secured by Letters Patent of the United States is:

1. Apparatus for use with a rotatable power shaft and an auger for boring through relatively hard non-homogeneous material, said apparatus comprising:

shaft means for connection at one end with said power shaft, an auger, secondary shaft means movably mounting said auger extending from the opposite end of said shaft means, said secondary shaft means being rotatable with said shaft means and axially displaceable for a limited extent relative thereto, means positioned in said shaft means for providing a succession of rapid axial impacts on said secondary shaft means thereby impacting said auger into said material, and means positioned in said shaft means between said first-mentioned end and said impacting means for shock-isolating said impacting means from said shaft means and for absorbing the reaction to impacts on said secondary shaft means.

2. Apparatus as in claim 1 wherein said reaction-absorbing means comprises:
spring means mounted at one end to said end of the shaft means and at the other end mounted to said impacting means.

3. Apparatus as in claim 1 wherein:
said impacting means is a vibrator adapted to be actuated by pressurized fluid,
said shaft means has a passageway in said first-mentioned end for receiving pressurized fluid,
said apparatus further comprises flexible conduit means extending from said shaft means passageway to said impacting means.

4. Apparatus as in claim 3 wherein:
said secondary shaft means comprises a mounting face and a shaft telescoped into said shaft means, said shaft and said shaft means interfitting to permit relative axial displacement,
said shaft having a generally radial slot extending therethrough,
said apparatus further comprises a generally radial rod extending through said slot and secured to said shaft means, thereby limiting relative axial displacement.

5. Apparatus as in claim 1 in combination with:
a power unit having a rotatable drive shaft for connection with said shaft means,
means for generating a supply of pressurized fluid,
means for providing an annular chamber around said power shaft,
conduit means extending from said fluid supply means to said annular chamber means,
passageway means extending from said annular chamber through said drive shaft to the passageway in said shaft means.

6. Apparatus as in claim 4 wherein:
said power unit is adapted to be advanced toward said material a substantial distance whereby said auger bores a longitudinal passageway into said material,
said shaft means further comprises a helix formed thereon for removal of material from said passageway,
said fluid supply means is adapted to supply pressurized air,
said impacting means is adapted to receive pressurized air for actuation and discharge said air through the side of said shaft means so that discharge air flows out of said passageway and aids in the removal of material from said longitudinal passageway.

7. Apparatus as in claim 5 wherein:
said apparatus further comprises means for urging said power unit and said shaft means into said material,
said drive shaft has an axial extension portion for connection with said shaft means,
said shaft means is adapted to be telescoped over said drive shaft, the telescoped portions of said drive shaft and said shaft means interfitting to cause said shafts to rotate together,
said passageway means comprises:
a passageway extending from the annular chamber to the exterior of said drive shaft and conduit means extending from said passageway to the passageway in the first-mentioned end of said shaft means.

8. Apparatus as in claim 7 wherein:
said urging means is adapted to reciprocate said power unit a given distance,
said apparatus further comprises at least one intermediate shaft positioned between said power unit and said shaft means for enabling said apparatus to drill a passageway into said material longer than said given distance,
said intermediate shaft having end portions for telescoping over the axial extension of said power shaft and into the shaft means,
said conduit means includes a longitudinal conduit secured to said intermediate shaft and extending to the first-mentioned end of said shaft means.

9. Apparatus as in claim 8 wherein:
said intermediate shaft further comprises a helix formed thereon for carrying said material away from said auger.

10. Apparatus for use with a rotatable power shaft and an auger for boring through relatively hard non-homogeneous material, said apparatus comprising:
shaft means connected at one end with said power shaft,
an auger connected at the other end of said shaft means,
oscillating means disposed within said shaft means, and
shock-isolating means disposed rearwardly of said oscillating means and rotatable therewith, said shock-isolated oscillating means applying a succession of rapid axial inputs to said auger during rotation thereof.

References Cited
UNITED STATES PATENTS

| | | | |
|---|---|---|---|
| 884,152 | 4/1908 | Hardsocg | 175—102 |
| 888,164 | 5/1908 | Hardsocg | 175—102 |
| 2,999,572 | 9/1961 | Hinckley | 175—102 X |
| 3,232,361 | 2/1966 | Haspert | 175—102 |

NILE C. BYERS, JR., Primary Examiner

U.S. Cl. X.R.

173—43